Oct. 20, 1931.  D. C. SMITH  1,828,233
LENS
Original Filed Dec. 11, 1922
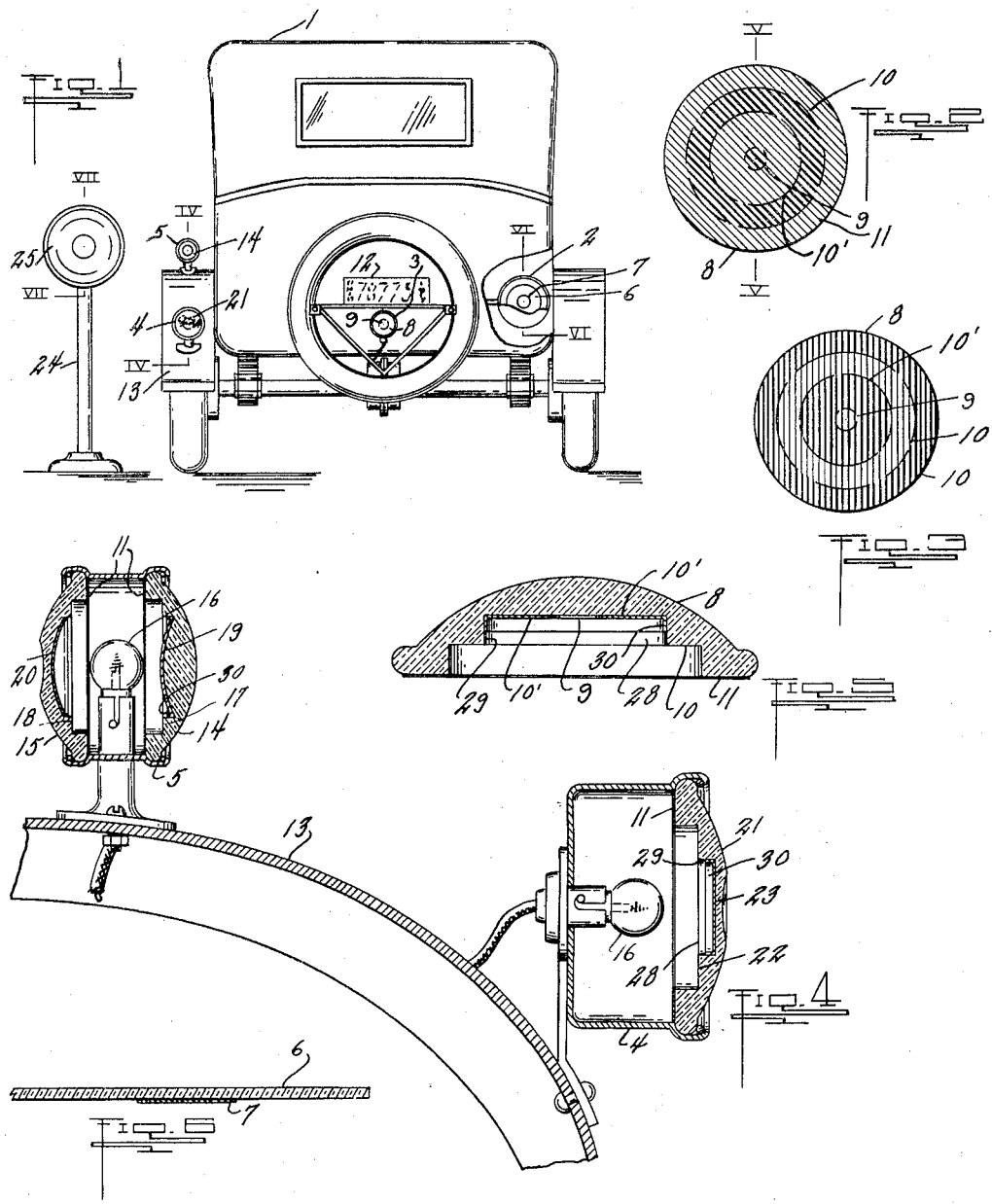
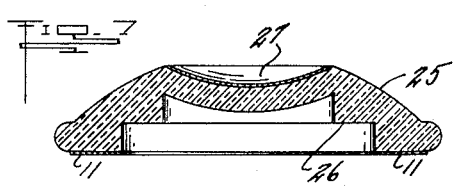

Patented Oct. 20, 1931

1,828,233

UNITED STATES PATENT OFFICE

DAVID C. SMITH, OF TOLEDO, OHIO, ASSIGNOR TO KADON FOUNDATION INC., OF TOLEDO, OHIO, A CORPORATION OF DELAWARE

LENS

Continuation of application Serial No. 606,301, filed December 11, 1922. This application filed May 14, 1928. Serial No. 277,601.

This invention relates to light reflection, as for automatic return indication of a location.

This invention has utility when incorporated in lenses, especially in connection with traffic lights and for motor vehicles.

Referring to the drawings:

Fig. 1 is a rear elevation of a motor vehicle, parts being broken away, the vehicle having incorporated therewith features of the invention herein disclosed;

Fig. 2 is a detail view on an enlarged scale of a green tail light lens of the invention operating not to transmit light;

Fig. 3 is a detail view in outside elevation, on an enlarged scale of a red parking signal light rear lens lighted;

Fig. 4 is a section on the line IV—IV, Fig. 1, through the parking and stop lights;

Fig. 5 is a section on the line V—V, Fig. 2;

Fig. 6 is a section on the line VI—VI, Fig. 1, showing the headlight lens; and

Fig. 7 is a section on the line VII—VII, Fig. 1.

Motor vehicle 1 is shown as equipped with headlight 2, tail light 3, stop light 4, and parking light 5.

The headlight 2 is shown as equipped with a lens 6 having centrally on the inner side thereof a duco coated, mirrored or silvered back or reflecting portion 7. As so positioned this reflecting section provides a central opaque dimming portion as to the light emitting filament in the bulb in the headlight, while should the automobile 1 be left standing, say in daylight until after nightfall, or through some mishap or accident the head light not be effective as a source of illumination, the reflecting portion 7 in receiving rays from an approaching headlight will reflect such back toward the driver of an oncoming car, so that such driver may readily locate by such reflection that there is an object to be avoided. This is an automatic return indication and a safe-guarding device at all times operative. It is never of an intensity to approximate a glare, but is readily and easily located by the return rays.

The tail light 3 is shown as equipped with a circular lens 8 having light transmitting central portion 9 and concentric therewith light transmitting ring 10. These are effective, when the bulb in the tail light 3 is illuminated, to disperse a general rear traffic signal, tending to diffuse throughout for disclosing the lens color to an oncoming driver. However, should the bulb in the tail light 3 be not lighted, the head lights of an oncoming car may direct rays of light through the lens 8 to strike reflecting portions or mirror rings 10', 11, to have such white light or yellow light rays reflected back as colored rays from the lens 8, thereby visibly indicating to the oncoming driver necessity for caution in avoiding the carrier of such indication. Of course, it requires a source of illumination in the tail light 3 to disclose from such light license number 12.

On fender 13 is mounted the parking light 5, having rearward colored lens 14, and forward clear, yellow or other colored lens 15. With parking light 16 on, light transmitting rings 17, 18, respectively of the lens 14, 15, diffuse light for general warning indication of the parking location of the vehicle. With the light 16 off, any approaching strong light will have rays therefrom strike inner central light ray reflecting back portions 19, 20, respectively of the lenses 14, 15. Accordingly as the lens is clear or colored, light rays are automatically of like indication, and diffusion is effective in conjunction with outer reflecting rings 11. These reflecting portions are coatings, opaque on the back and lustrous toward the glass or lens portion so coated.

When the stoplight 4 has its bulb 16 lighted, light rays therefrom may pass and be diffused by lens 21, having light transmitting ring portion 22. With the light off, central back coated reflecting portion 23, in conjunction with reflecting coating ring 11, may diffuse rays striking this lens 21, to make the lens clearly visible as a stop signal. However, this operation is continuous at all times the light rays are toward the lens 21, and is independent of any driving or control actions of the vehicle operator.

As a traffic signal, even without a source of light, standard 24 may carry lens 25 having light transmitting ring 26 about reflecting coating 27 and surrounded by reflecting ring coating 11. With vehicles approaching the lens 25 from opposite directions, the transmitted light, of the color imparted by the lens 25, may be observed by each driver as coming from the ring 26. The driver from one direction, say from the back or hollow side of the lens 25, may from his headlights get a reflection from the reflecting coating 27, while a driver from the opposite direction may have the traffic signal located by observing reflected rays from the ring 11.

For assisting in the diffusion, countersunk portions 28 have the shoulders 29 thereabout provided with coating 30 extending only partially of the height of the shoulder 29 from the countersink 28. In practice this seems to be of value in dispersing the light rays, with colored lenses especially, so that the full lens extent appears to be active either for transmitting or reflecting light rays. This is more particularly the impression at distances ranging above one hundred feet.

This is a continuation of application S. N. 606,301, filed Dec. 11, 1922, Lenses, by the same applicant, and a continuation in part disclosing matter reserved for separate application and divided out of S. N. 747,015, filed October 31, 1924, which application has developed into Patent 1,670,011, of date May 15, 1928.

What is claimed and it is desired to secure by Letters Patent is:

A traffic signal glass circular lens having a convex outer side, said lens having rearwardly from said convex outer side a marginally peripherally projecting flange, said lens oppositely from said convex outer side and out of the plane of said flange having in a central region and integral with said flange a mirror reflecting surface fronting toward the central portion of said convex outer side.

In witness whereof I affix my signature.

DAVID C. SMITH.

CERTIFICATE OF CORRECTION.

Patent No. 1,828,233.

Granted October 20, 1931, to

DAVID C. SMITH.

It is hereby certified that the name of the assignee in the above numbered patent was erroneously written and printed as "Kadon Foundation Inc.", whereas said name should have been written and printed as Kadow Foundation Inc., as shown by the records of assignments in this office; and that the said Letters Patent should be read with this correction therein that the same may conform to the record of the case in the Patent Office.

Signed and sealed this 17th day of November, A. D. 1931.

(Seal)

M. J. Moore,
Acting Commissioner of Patents.